United States Patent [19]

Solc et al.

[11] 4,416,945

[45] Nov. 22, 1983

[54] MAGNETIC IMBIBER POLYMERS AND METHOD FOR THE PREPARATION THEREOF

[75] Inventors: Jitka Solc, Midland; Daniel H. Haigh, Sanford, both of Mich.

[73] Assignee: The Dow Chemical Company, Midland, Mich.

[21] Appl. No.: 345,291

[22] Filed: Feb. 3, 1982

[51] Int. Cl.[3] ........................ B32B 27/14; B32B 32/00

[52] U.S. Cl. .................................... 428/407; 428/900; 523/204; 523/201; 524/431

[58] Field of Search ............... 523/200, 201, 204, 202, 523/223; 524/570, 576, 577, 431, 435, 450; 428/407, 900

[56] References Cited

U.S. PATENT DOCUMENTS

| | | | |
|---|---|---|---|
| 3,632,369 | 1/1972 | Hahn | 428/407 |
| 3,970,725 | 7/1976 | Tugukuni et al. | 523/202 |
| 4,013,615 | 3/1977 | Ohashi et al. | 523/202 |
| 4,066,539 | 1/1978 | Hachisu et al. | 428/407 |
| 4,248,765 | 2/1981 | Patil et al. | 524/431 |
| 4,254,207 | 3/1981 | Landoll et al. | 524/431 |
| 4,325,856 | 4/1982 | Ishikawa et al. | 523/201 |

*Primary Examiner*—Allan Lieberman
*Attorney, Agent, or Firm*—R. B. Ingraham

[57] ABSTRACT

Magnetic imbiber polymers are prepared by grafting a water soluble polymer on the surface of an oil imbiber polymer and exposing the grafting imbiber polymer to a colloidal magnetic material such as magnetic iron oxide.

5 Claims, No Drawings

MAGNETIC IMBIBER POLYMERS AND METHOD FOR THE PREPARATION THEREOF

Oftentimes it is desirable to separate organic liquids from substrates such as water and the like. The separation of organic materials from various substrates is well-known as set forth in U.S. Pat. Nos. 3,520,806; 3,686,827; 3,750,699; and 3,881,295; the teachings of which are herewith incorporated by reference thereto. Such operations may employ oil imbibing polymer particles. Removal of such oils from water is oftentimes accomplished by passing an oil containing liquid through a bed of particulate oil imbibing polymer. However, in many instances, it would be desirable if a body of fluid such as a gas or liquid could be readily exposed to uncontained oil imbibing particles and the particles readily recovered therefrom.

It would be desirable if there were available an improved oil imbibing polymer particle.

It would also be desirable if there were available an improved oil imbibing polymer particle which could be dispersed in a fluid body and readily recovered therefrom.

It would also be desirable if there were available an improved method for the preparation of oil imbibing polymer particles.

These benefits and other advantages of the present invention are achieved in a magnetic oil imbibing particulate polymer comprising a plurality of oil-swellable oil-insoluble polymer particles having a plurality of magnetic particles in association with the polymer particles.

Also contemplated within the scope of the present invention is a method for the separation of an oil from water, the steps of the method comprising contacting an oil-containing aqueous body with a plurality of oil-imbibing oil-insoluble magnetic polymer particles for a sufficient time for said particles to be swollen by said oil and magnetically separating said particles from said aqueous body.

Oil-imbibing polymers useful in the present invention are any polymers which swell on contact with organic liquids but do not dissolve therein. Selection of an oil imbibing polymer for use with any particular organic liquid is readily accomplished by determining a swelling index for polymer particles in the organic liquid. Beneficially such a swelling index is readily determined by immersing a particular polymer to be evaluated in an organic liquid until the polymer has reached equalibrium swelling, and determining the volume per unit weight of the polymer after a period of 30 minutes in the organic liquid. The ratio of the volume per unit weight with organic liquid to the volume per unit weight of the polymer provides the swelling index.

If the swelling index is greater than about 1.2, the polymer particles are useful in the practice of the present invention. Beneficially for most applications swelling index of at least 1.5 and preferably greater than about 3 is desirable. It is critical to the practice of the present invention to employ a crosslinked polymer which swells but does not dissolve. If the polymer swells in the presence of the organic liquid or water, it is suitable for the practice of the present invention. However, for most applications it is desirable to employ a polymer which is crosslinked to a sufficient degree that it exhibits a swelling index between about 1.5 and 50 and preferably between about 3 and 50. By utilizing the crosslinked polymer the hazard of dissolution of the polymer over extended periods of time is eliminated. However, for many applications particularly those where the quantity of polymer is large relative to the volume of the hazardous liquid, uncrosslinked polymer is eminently satisfactory. A wide variety of polymeric materials are employed with benefit. Such polymers for organic liquids include polymers of styrenes and substituted styrenes; copolymers of vinyl chloride such as a copolymer of 60 weight percent vinyl chloride and 40 weight percent vinyl acetate; vinylidene chloride copolymers such as a copolymer of 75 percent vinylidene chloride and 25 percent acrylonitrile; acrylic polymers such as polymers of methylmethacrylate, ethyl acrylate and the like. In general the chemical composition of the polymers is not critical. The polymers useful in the present invention show significant swelling; that is, at least a 25 percent increase in volume in a period of at least 10 minutes in the organic liquid to which the polymers are required to respond under desired service conditions of temperature. Particularly advantageous materials which respond to a wide variety of organic liquids are polymers of styrene such as polystyrene and polymers of styrene and divinylbenzene containing up to about 10 weight percent divinylbenzene. For general use with aliphatic and aromatic hydrocarbons, alkylstyrene polymers are of particular benefit. Such alkylstyrene polymers swell very rapidly on contact with aliphatic and/or aromatic hydrocarbons. Generally the more rapid the swelling of the polymer, the more rapid the imbibition when the organic liquid is contacted. Alkylstyrene polymers usually show substantial swelling when in contact with organic liquids in less than 1 minute.

Preferably for many organic liquids, crosslinked polymers of styrenes, and advantageously of tertiary-alkylstyrenes, are utilized as the imbibing agent in the process of this invention. Those alkylstyrenes which can be used to prepare these polymers have alkyl groups containing from four to 20, and preferably from four to 12, carbon atoms such as: tertiary-alkylstyrenes including for example, p-tert-butylstyrene, p-tert-amylstyrene, p-tert-hexyl-styrene, p-tert-octylstyrene, p-tert-dodecylstyrene, p-tert-octadecylstyrene, and p-tert-eicosylstyrene; n-alkylstyrenes including for example n-butylstyrene, n-amylstyrene, n-hexylstyrene, n-octylstyrene, n-dodecyl-styrene, n-octadecylstyrene, and n-eicosylstyrene; sec-alkylstyrenes including for example sec-butylstyrene, sec-hexylstyrene, sec-octylstyrene, sec-dodecylstyrene, sec-octadecylstyrene, and sec-eicosylstyrene; isoalkyl-styrenes including for example isobutylstyrene, iso-amylstyrene, isohexylstyrene, isooctylstyrene, isododecyl-styrene, isooctadecylstyrene, and isoeicosylstyrene; and copolymers thereof.

Especially preferred for use in the practice of the invention are cross-linked copolymers of such alkylstyrenes as heretofore described and an alkyl ester derived from $C_1$ to $C_{20}$ alcohol and acrylic or methacrylic acid or mixtures thereof.

Suitable monomers which may be employed as comonomers with the alkylstyrene include such materials as vinyl-naphthalene, styrene, a-methylstyrene, ring-substituted methylstyrenes, halostyrenes, arylstyrenes and alkaryl-styrenes; methacrylic esters, acrylic esters, fumarate esters and half esters, maleaste esters and half esters, itaconate esters and half esters, vinyl biphenyls, vinyl esters of aliphatic carboxylic acid esters, alkyl vinyl ethers, alkyl vinyl ketones, a-olefins, isoolefins, butadiene, isoprene, dimethylbutadiene, acrylonitrile, methacrylonitrile and the like.

It is desirable that the polymers used in the process of the invention contain a slight amount of cross-linking agent, preferably in the range of from about 0.01 to 2 percent by weight. The most efficient imbibition of organic liquid or water occurs when the level of cross-linking agent is less than about 1 percent since this permits the polymers to swell easily and imbibe a substantial volume of the organic or aqueous material.

Cross-linking agents which can be used in preparing the imbibing polymers suitable for use in the present invention include polyethylenically unsaturated compounds such as divinylbenzene, diethylene glycol dimethacrylate, diisopropenylbenzene, diisopropenyldiphenyl, diallymaleate, diallylphthalate, allyiacrylates, allylmethacrylates, allyfumarates, allylitaconates, alkyd resin types, butadiene or isoprene polymers, cyclooctadiene, methylene norbornylenes, divinyl phthalates, vinyl isopropenylbenzene, divinyl biphenyl, as well as any other di- or poly-functional compound known to be of use as a cross-linking agent in polymeric vinyl-addition compositions.

Normally, the polymer containing the cross-linking agent swells with the imbibed organic material or water. If there is too much cross-linking agent, the imbibition takes an unreasonably long time or the polymer is unable to imbibe a sufficient quantity of the organic liquid or water and closes the interstitial spaces in the body. If the imbibitional polymer contains no cross-linking agent or too little cross-linking agent, then it will dissolve eventually in the water or organic material resulting, for example, in a non-discrete, non-particulate mass of polymer-thickened organic liquid or water. However, for many applications where exterior packaging is sufficiently large, uncross-linked material is satisfactory.

Polymers for the practice of the method of the present invention may be prepared by any convenient technique, either suspension, emulsion or mass polymerization. Generally, the method of preparation is selected to provide a polymer in the most convenient form for any particular application. Thus, if it is desired to have free-flowing, readily packed beads, generally suspension polymerization is employed to provide a plurality of small beads. It is oftentimes desirable to employ an emulsion polymerization technique and recover the polymer by spray drying if most rapid imbibition is desired. If it is desired to obtain a body of predetermined configuration, it is oftentimes beneficial to employ a mass polymerization technique wherein a polymer-insoluble diluent is employed. Techniques for the preparation of such porous polymers are disclosed in U.S. Pat. No. 3,322,695, the teachings of which are herewith incorporated by reference. Such porous polymers can also be prepared by either suspension or mass polymerization. Alternately, satisfactory beads are prepared by mass or suspension polymerization with subsequent comminution of the polymer prepared by the mass technique. The particle size of such polymers is selected in accordance with the desired application, larger particles being employed for slower imbibition, smaller particles for higher absorption and rapid imbibition. For most applications such particles are from about 0.1 to 5 millimeters in diameter. Alternately, porous polymer beads may be polymerized in desired shapes in the manner disclosed by U.S. Pat. No. 3,322,695.

Magnetic particles in accordance with the present invention and suitable for the practice of the method of the invention are of two general types. The first type simply incorporates magnetic particles within the polymer particle in the manner described in U.S. Pat. No. 4,198,307, the teachings of which are incorporated by reference thereto. Magnetic particles are suspended in monomer droplets and the droplets are polymerized to provide desired polymer beads having magnetic particles dispersed therethrough. The second type of polymer particle is one having its external surface coated with a layer of magnetic particles. Such particles are prepared by preparing a swellable core, grafting a polymer of a water soluble monomer on the surface of the swellable core generally in the manner disclosed in U.S. Pat. No. 4,280,923 and subsequently contacting the particles with a magnetic particle dispersion having an opposite ionic charge to thereby form a magnetic coating thereon.

Water soluble monomers useful in the practice of the present invention are generally utilized in minor proportions usually ranging from about 0.1 to 10 weight percent based on the weight of the oil-imbibing polymer and preferably from about 1.0 to about 5 weight percent. Typical water soluble monomers which are useful in the practice of the present invention include ethylenically unsaturated carboxylic acids or the acid salts, such as acrylic acid, sodium acrylate; methacrylic acid, itaconic acid and maleic acid. Other water soluble monomers include carboxamides such as acrylamides vinyl pyrrolidone; hydroxyalkyl acrylates and methacrylates such as hydroxyethyl acrylate, hydroxpropyl acrylate and hydroxethyl methacrylate; aminoalkyl esters of unsaturated acids such as 2-aminomethyl methacrylate; epoxy functional monomers such as glycidyl methacrylate; sulfoalkyl esters of unsaturated acids, such as 2-sulfoethyl methacrylate ethylenically unsaturated quaternary ammonium compounds such as vinylbenzyl trimethyl ammonium chloride and mixtures thereof.

Colloidal magnetic dispersions suitable for use in the practice of the present invention generally comprise colloidal particles having dimensions of from about 50 Å to about one micron which are water insoluble and water dispersible; preferably the particles are from about 50 Å to 1000 Å. The quantity of magnetic responsive material contained in or on the particles in accordance with the present invention generally is on the order of about 1 to about 20 weight percent based on the total weight of the article.

Representative examples of useful magnetically responsive materials include ferromagnetic substances such as the metallic oxides (e.g., $BaFe_{12}O_{19}$, $Fe_3O_4$, CoO, NiO, $Mn_2O_3$) iron and nickel particles, etc. Another useful ferromagnetic material is CoMnP. Such particles may be anionic or cationic by treatment with suitable surface active agents. Generally in the practice of the present invention, it is desirable to have oil-imbibing polymer in the form of particles. Such particles generally are spherical in shape and have diameters ranging from about 1 micron to about 3 millimeters. Generally particles having diameters of from about 25 to 150 microns are preferred for most applications. Such particles generally are prepared by suspension polymerization and oftentimes have a surface more or less coated with a suspending agent. Usually it is desirable prior to grafting the polymer of the water soluble monomer onto the surface of the oil imbibing particles that the oil imbibing particles be washed to remove the suspending agent therefrom. Most suspending agents are readily removed by washing the particles with 1 N hydrochloric acid and removing the acid therefrom with deionized water.

The outer coating of swellable polymer on the granules can be formed by any known surface-bonding technique such as generally described by Battaerd et al. referred to above, by Horowitz, U.S. Pat. No. 3,698,931, or by Horvath et al., Anal. Chem. 39, 1422 (1967) Granules can also be coated with polymer molecules by a mechanical abrasion initiation of polymerization in a ball or vibrator mill as described by Tamura, Japanese Pat. No. 76/45686. Preferably, the coating is formed by irradiating a mixture of core particles and about 0.05–0.5 parts based on the weight of core particles of liquid hydrophilic monomer or polymer with a source of high intensity ionizing radiation such as gamma rays. Gamma rays irradiation is preferably carried out at about room temperature using a radiation rate of approximately 0.1–1.0 megarad per hour and a maximum dose of about 3 megarads. Optimum results have been obtained by irradiation at about 0.1–0.4 megarad per hour with a total dose of about 0.1–3 megarads. Generally, cationic coatings are best prepared using radiation rates in the higher range and nonionic coatings require relatively high total doses of radiation, the optimum amount of radiation in each case varying inversely with the reactivity of the monomer or polymer used to form the coating.

The use of nonpenetrating radiation such as an accelerated electron beam to initiate polymerization requires a modified technique, for example, polymerization in shallow trays with a lower dose rate of about 0.005–0.02 megarads per pass with total dosage and other conditions generally as described above.

The surface-bonding process can be carried out successfully using either the hydrophilic monomer or a polymer thereof. A solvent for the hydrophilic monomer or polymer is preferably employed and polar solvents such as water, aqueous NaOH, methanol, ethanol, or aqueous alcohol are preferred. The proportion of coating reactant to core particles as defined above is calculated to produce a coated product where the swellable polymer coating amounts to about 0.01–10 percent by weight of the whole depending on the core particle size used.

When the oil imbibing polymer particles have formed thereon a polymer of the water soluble monomer, the resultant grafted particles are then exposed to the magnetically responsive colloid. Generally such an exposure can be of relatively limited duration; for example, 30 minutes to 200 hours at room temperature. Such contacting can be done at any convenient temperature above the freezing point of water and at a temperature below that at which the magnetically responsive colloid coagulates or flocculates. Generally, it is desirable to water wash the treated particles to remove any particle unassociated remainder of the magnetically responsive colloid from the particles.

The present invention is further illustrated but not limited by the following example:

A plurality of lightly crosslinked particles of a polymer of tertiary-butylstyrene and divinylbenzene which have swelling index in toluene of about 30 and an average diameter of about 100 microns were suspended in a 6 normal hydrochloric acid solution at a temperature of about 90° C. for a period of about 3 hours. The particles were subsequently cooled to room temperature and washed with deionized water. 20 Grams of the washed particles were dispersed in 20 ml of methanol containing 10 ml of glacial acrylic acid and 1 milliliter of a 10 percent solution of the sodium salt of ethylene diamine tetra acetic acid. The resultant suspension was irradiated by a 2 million electron volt electron beam for a total of 20 passes of 0.05 megarads to yield a total radiation dose of one megarad. The irradiated particles are washed with deionized water and dispersed in deionized water. The colloidal magnetic iron oxide dispersion was admixed with the polymer particles and allowed to stand for 27 hours at room temperature. The magnetically responsive colloidal iron oxide is commercially available under the trade designation of Ferrofluid A-01. The particles were subsequently washed and suspended in deionized water. The resultant particles readily imbibe toluene from water and other generally water-insoluble oils, and the particles are readily collected using a permanent magnet.

In a manner similar to the foregoing preparations two series of beads were prepared wherein the thickness of the glatinous polyacrylic acid layer was varied. The first series was designated as A and the second series as B. The particles of each series were treated for various periods of time indicated below with a cationic dispersion of magnetic iron oxide ranging in size from 100 to 300 angstroms and commercially available under the trade designation of Ferrofluid A-01. The treatment with the magnetic iron oxide dispersion resulted in magnetic layer thicknesses of from about 0.13 to about 0.7 micrometers for the A series and from about one-tenth to one-half micrometer for the B series. The thickness of the layers was determined by transmission electron microscopy. Samples of the resultant particles were placed in a microscope cell and photographed. After the initial photograph, 5 to 6 drops of No. 2 fuel oil were added to the cell and the particles photographed. After 5 minutes immersion, 1-hour, 2-hour and 3-hour immersions, the photographic images were measured to obtain the relative swelling. The results are set forth in the following table where under "Sample Description" Untreated indicates particles that have not been exposed to the magnetic colloid; and the periods in hours indicate the length of time that the particles had been exposed to the magnetic colloid.

| Sample | Diameter of Bead Image in mm | | | | |
|---|---|---|---|---|---|
| Description | Zero | 5 Min. | 1 Hour | 2 Hours | 3 Hours |
| A (Untr.) | 18.08 | 38.08 | 48.32 | 48.30 | 48.12 |
| A (2 hours) | 15.30 | 31.15 | 38.22 | 37.90 | 37.57 |
| A (20 hours) | 17.41 | 36.79 | 40.57 | 40.22 | 39.17 |
| A (48 hours) | 16.74 | 32.38 | 39.40 | 38.25 | 38.43 |
| B (untr.) | 14.28 | 29.78 | 34.62 | 34.12 | 34.12 |
| B (2 hours) | 14.44 | 31.86 | 35.32 | 35.22 | 35.30 |
| B (19 hours) | 14.40 | 29.99 | 34.81 | 34.31 | 34.09 |
| B (72 hours) | 14.82 | 29.98 | 34.45 | 33.96 | 34.15 |

The foregoing data indicate that the magnetic coating has little effect on the oil swellability of the particles.

In a manner similar to the foregoing, other magnetically responsive oil imbibing polymer particles are readily prepared.

As is apparent from the foregoing specification, the present invention is susceptible to being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as is set forth and defined in the hereto-appended claims.

What is claimed is:

1. A magnetic oil imbibing particulate polymer comprising a plurality of oil-swellable oil-insoluble polymer particles having a diameter of from about 1 micron to about 3 millimeters, a plurality of magnetic particles on a surface of the polymer particles, the magnetic particles being about 50 angstroms to about 1 micron in diameter and being 1–20 weight percent of the polymer, with the further limitation that the polymer particles have a swelling index of at least 1.2, wherein the swelling index is determined by immersing a particular polymer to be evaluated in an organic liquid until the polymer has reached equalibrium swelling, and determining the volume per unit weight of the polymer after a period of 30 minutes in the organic liquid; wherein the ratio of the volume per unit weight with organic liquid to the volume per unit weight of the polymer provides the swelling index.

2. The polymer of claim 1 including a polymer of a water soluble monomer on the surface of the polymer particle.

3. The polymer of claim 1 wherein the magnetic particles are magnetic iron oxide.

4. The polymer of claim 1 wherein the particulate polymer is a copolymer of tertiarybutyl styrene and divinyl benzene.

5. The polymer of claim 1 wherein the polymer particles have a swelling index of about 1.5 to 50.

* * * * *